(12) United States Patent
Pearson (10) Patent No.: US 7,144,646 B2
(45) Date of Patent: Dec. 5, 2006

(54) METHOD AND APPARATUS FOR MULTIPLE MODE CONTROL OF VOLTAGE FROM A FUEL CELL SYSTEM

(75) Inventor: Martin T. Pearson, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 691 days.

(21) Appl. No.: 10/017,462

(22) Filed: Dec. 14, 2001

(65) Prior Publication Data

US 2003/0113599 A1  Jun. 19, 2003

(51) Int. Cl.
- H01M 8/18 (2006.01)
- H02J 7/00 (2006.01)
- H02J 7/04 (2006.01)
- H02J 7/16 (2006.01)

(52) U.S. Cl. .................... 429/21; 429/21; 320/118; 320/122; 320/134; 320/152; 320/148; 320/151; 320/157; 320/149; 307/66

(58) Field of Classification Search ............... 429/23, 429/9, 13, 22, 21; 320/101, 118, 122, 134, 320/152, 148, 151, 157, 149; 307/66
See application file for complete search history.

(56) References Cited

U.S. PATENT DOCUMENTS

| | | | |
|---|---|---|---|
| 3,800,208 A | 3/1974 | Macharg | 320/20 |
| 3,823,358 A * | 7/1974 | Rey | 320/101 |
| 4,000,003 A | 12/1976 | Baker et al. | 429/7 |
| 4,056,764 A | 11/1977 | Endo et al. | 320/3 |
| 4,721,660 A | 1/1988 | Kujas | 429/40 |
| 4,839,574 A | 6/1989 | Takabayashi | 320/3 |
| 4,883,724 A | 11/1989 | Yamamoto | 429/23 |
| 4,904,548 A | 2/1990 | Tajima | 429/22 |
| 4,931,947 A | 6/1990 | Werth et al. | 364/492 |
| 4,962,462 A | 10/1990 | Fekete | 364/492 |
| 5,154,986 A | 10/1992 | Takechi et al. | 429/23 |
| 5,318,142 A | 6/1994 | Bates et al. | 180/65.2 |
| 5,334,463 A | 8/1994 | Tajima et al. | 429/9 |
| 5,339,018 A | 8/1994 | Brokaw | 320/35 |

(Continued)

FOREIGN PATENT DOCUMENTS

DE  1 080 680  4/1960

(Continued)

OTHER PUBLICATIONS

Warner, S., "Extending the Reliability of DC Power in a Telecommunications Network," in *Proceedings of the 15th Int'l. Telecommuications Energy Conference*, Paris, France, 1993, pp. 83-86.

(Continued)

*Primary Examiner*—Patrick Joseph Ryan
*Assistant Examiner*—Angela J. Martin
(74) *Attorney, Agent, or Firm*—Seed IP Law Group PLLC (57) ABSTRACT

A fuel cell system determines each of a battery charging current error, a battery voltage error, and a stack current error. The fuel cell system regulates current through a series pass element in response to a greater of the determined errors. Thus, the fuel cell system operates in three modes: battery voltage limiting mode, stack current limiting mode and battery charging current limiting mode. Additionally, there can be a fourth "saturation" mode where the stack voltage $V_S$ drops below the battery voltage $V_B$ as the load pulls even more current. Individual fuel cell systems can be combined in series and/or parallel to produce a combined fuel cell system having a desired output voltage and current.

12 Claims, 10 Drawing Sheets

U.S. PATENT DOCUMENTS

| | | | | |
|---|---|---|---|---|
| 5,465,011 | A | * | 11/1995 | Miller et al. .................. 307/64 |
| 5,482,790 | A | | 1/1996 | Yamada et al. ................ 429/9 |
| 5,624,768 | A | | 4/1997 | Tanokura ..................... 429/23 |
| 5,714,874 | A | | 2/1998 | Bonnefoy ................... 323/299 |
| 5,780,980 | A | | 7/1998 | Naito .......................... 318/139 |
| 5,916,699 | A | | 6/1999 | Thomas et al. ................ 429/3 |
| 5,929,594 | A | | 7/1999 | Nonobe et al. ............. 320/104 |
| 5,998,885 | A | | 12/1999 | Tamor et al. .............. 307/10.1 |
| 6,011,324 | A | | 1/2000 | Kohlstruck et al. ........... 307/64 |
| 6,030,718 | A | | 2/2000 | Fuglevand et al. ........... 429/26 |
| 6,100,665 | A | | 8/2000 | Alderman .................... 320/127 |
| 6,134,124 | A | | 10/2000 | Jungreis et al. ............... 363/34 |
| 6,158,537 | A | | 12/2000 | Nonobe ...................... 180/65.3 |
| 6,184,593 | B1 | | 2/2001 | Jungreis ....................... 307/64 |
| 6,214,484 | B1 | * | 4/2001 | Hauer ........................... 429/9 |
| 6,215,272 | B1 | | 4/2001 | Ohara et al. ................. 320/104 |
| 6,255,008 | B1 | * | 7/2001 | Iwase ............................. 429/9 |
| 6,497,974 | B1 | | 12/2002 | Fuglevand ................... 429/22 |
| 6,555,989 | B1 | | 4/2003 | Pearson ...................... 320/101 |
| 2001/0044040 | A1 | | 11/2001 | Uribe et al. .................. 429/13 |
| 2001/0049038 | A1 | | 12/2001 | Dickman et al. ............. 429/19 |
| 2001/0053465 | A1 | | 12/2001 | Fuglevand |
| 2002/0021109 | A1 | | 2/2002 | Marvin et al. .............. 320/134 |
| 2002/0031692 | A1 | | 3/2002 | Fuglevand et al. ........... 429/22 |
| 2002/0036430 | A1 | | 3/2002 | Welches et al. ............... 307/18 |
| 2002/0051898 | A1 | | 5/2002 | Moulthrop, Jr. et al. ...... 429/17 |
| 2002/0094476 | A1 | | 7/2002 | Mattejat et al. ............. 429/160 |
| 2002/0102447 | A1 | | 8/2002 | Kato ........................... 429/23 |
| 2002/0109410 | A1 | | 8/2002 | Young et al. ................. 307/64 |
| 2002/0169523 | A1 | | 11/2002 | Ross et al. .................. 700/286 |
| 2003/0022037 | A1 | | 1/2003 | Parr et al. ..................... 429/22 |
| 2003/0072977 | A1 | | 4/2003 | Speranza et al. .............. 429/9 |
| 2003/0113594 | A1 | | 6/2003 | Pearson ......................... 429/9 |
| 2004/0009380 | A1 | | 1/2004 | Pearson ....................... 429/23 |
| 2004/0126635 | A1 | | 7/2004 | Pearson ....................... 429/23 |
| 2004/0228055 | A1 | | 11/2004 | Pearson ..................... 361/93.1 |
| 2004/0229095 | A1 | | 11/2004 | Pearson ....................... 429/23 |

FOREIGN PATENT DOCUMENTS

| | | |
|---|---|---|
| DE | 1 301 861 | 8/1969 |
| DE | 100 10 985 A1 | 9/2001 |
| EP | 0 136 187 A2 | 4/1985 |
| EP | 0 334 474 B1 | 9/1989 |
| EP | 1 009 054 A2 | 6/2000 |
| EP | 1 065 775 A2 | 1/2001 |
| GB | 1131171 | 10/1968 |
| GB | 2 281 642 A | 3/1995 |
| WO | WO 01/71885 A1 | 9/2001 |
| WO | WO 01/73879 A1 | 10/2001 |
| WO | WO 02/084670 A1 | 10/2002 |
| WO | WO 02/095851 A1 | 11/2002 |

OTHER PUBLICATIONS

Maloney, T., "PEM-Battery: Design, Construction, and Test," *Power Computing Solutions, Inc.*, NETL Publications 1999 Conference Proceedings.

Ertl, H. et al., "A Novel Multi-Cell DC-AC Converter for Applications in Renewable Energy Systems," in *Proceedings of the 43rd Int'l Power Electronics Conference*, Jun. 2001.

Passive Component Industry, "Large-Can EDLC Capacitors: A Market in the Making," Jul./Aug. 2001, pp. 7-14.

Nickerson, J., "Ultracapacitors: Managing Power and Energy," Darnell Group, Inc. 2000.

Kato, N. et al., "A 1kW Portable Fuel Cell System Based on Polymer Electrolyte Fuel Cells," *NTT R and D 48*(12 :877-881, 1991.

Apollo 13 Review Board (Cortright Commission), "Report of Apollo 13 Review Board," NASA, pp. i-X; Appendix A, Jun. 15, 1970.

Key, T., "Fast Response, Load Matching Hybrid Fuel Cell," EPRI PEAC, Quarterly Review Meeting, Jul. 27, 2001.

Abstract of DE 19810468, espacenet database, Sep. 16,1999.

Abstract of JP 58-133789, with Japanese figures, espacenet database, Aug. 9, 1983.

Abstract of JP 59-134573, espacenet database, Aug. 2, 1984.

Abstract of JP 01-234024, with Japanese figures, espacenet database, Sep. 19, 1989.

Abstract of JP 05-047396, with Japanese figures, espacenet database, Feb. 26, 1993.

Abstract of JP 06-029029, espacenet database, Feb. 4, 1994.

Abstract of JP 06-314569, espacenet database, Nov. 8, 1994.

English Language Translation of Japanese Unexamined Patent No. JP 7-105965, Apr. 21, 1995.

Abstract of JP 08-050902, with Japanese Patent cover page, espacenet database, Feb. 20, 1996.

Abstract of JP 08-213032, with Japanese Patent cover page, espacenet database, Aug. 20, 1996.

Abstract of JP 11-191424, with Japanese figures, espacenet database, Jul. 13, 1999.

Boyer, C., et al., "Evaluation of Methods to Increase the Oxygen Partial Pressure in PEM Fuel Cells," *Journal of Applied electrochemistry 29*:1095-1102, 1999.

Mai, W., "Dual Current-Limiting Switch for USB Applications," *Electronic Design*, pp. 124, 126, May 2000.

Rufer, A., et al., "A Supercapacitor-Based Energy Storage System for Elevators with Soft Commutated Interface," in *Proceedings of the Energy Storage Association, Spring Meeting 2001*, Chattanooga, TN, Mar. 2001, retrieved from http://leiwww.epfl.ch/publications/rufer_barrade _ias_01.pdf.

Schneuwly, A., et al., "BOOSTCAP® Double-Layer Capacitors for Peak Power Automotive Application," in *Proceedings of the Energy Storage Association, Spring Meeting 2001*, Chattanooga, TN, Mar. 2001, retrieved from http://ecl.web.psi.ch/Publications/cap_pub/AABC_2002.pdf.

EPRIsolutions, Inc., "Market Assessment of Asymmetrical Ultracapacitors for Medium and High Power Applications," Palo Alto, CA, 2000, 1000810.

Power Distribution, Inc., "PDI Switcher Solutions: CBEMA Curve Reissued," Richmond, VA, 1998.

Texas Instruments Incorporated, "'Hot Plug-In' In-Rush Current Limiting Circuits for Power Trends' DC-DC Converters," Dallas TX, 2000.

U.S. Appl. No. 60/421,126, Pearson.

U.S. Appl. No. 06/436,759, Pearson.

Pearson, M., "Fuel Cell System Multiple Stage Voltage Control Method and Apparatus," U.S Appl. No. 10/017,461, filed Dec. 14, 2001.

Pearson, M., "Method and Apparatus for Controlling Voltage from a Fuel Cell System," U.S. Appl. 10/017,470, filed Dec. 14, 2001.

* cited by examiner

|  Fig. 4B  |
|---|

| Fig. 4A | Fig. 4C | Fig. 4D |
|---|---|---|

|  Fig. 4E |
|---|

…
METHOD AND APPARATUS FOR MULTIPLE MODE CONTROL OF VOLTAGE FROM A FUEL CELL SYSTEM

BACKGROUND OF THE INVENTION

1. Field of the Invention

This invention is generally related to fuel cell systems, and more particularly to controlling an output voltage of the fuel cell system.

2. Description of the Related Art

Electrochemical fuel cells convert fuel and oxidant to electricity. Solid polymer electrochemical fuel cells generally employ a membrane electrode assembly ("MEA") which includes an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane electrode interface to induce the desired electrochemical reaction. In operation, the electrodes are electrically coupled for conducting electrons between the electrodes through an external circuit. Typically, a number of MEAs are electrically coupled in series to form a fuel cell stack having a desired power output.

In typical fuel cells, the MEA is disposed between two electrically conductive fluid flow field plates or separator plates. Fluid flow field plates have flow passages to direct fuel and oxidant to the electrodes, namely the anode and the cathode, respectively. The fluid flow field plates act as current collectors, provide support for the electrodes, provide access channels for the fuel and oxidant, and provide channels for the removal of reaction products, such as water formed during fuel cell operation. The fuel cell system may use the reaction products in maintaining the reaction. For example, reaction water may be used for hydrating the ion exchange membrane and/or maintaining the temperature of the fuel cell stack.

Stack current is a direct function of the reactant flow, the stack current increasing with increasing reactant flow. The stack voltage varies inversely with respect to the stack current in a non-linear mathematical relationship. The relationship between stack voltage and stack current at a given flow of reactant is typically represented as a polarization curve for the fuel cell stack. A set or family of polarization curves can represent the stack voltage-current relationship at a variety of reactant flow rates.

In most applications, it is desirable to maintain an approximately constant voltage output from the fuel cell stack. One approach is to employ a battery in the fuel cell system to provide additional current when the demand of the load exceeds the output of the fuel cell stack. This approach often requires separate battery charging supply to maintain the charge on the battery, introducing undesirable cost and complexity into the system. Attempts to place the battery in parallel with the fuel cell stack to eliminate the need for a separate battery charging supply raises additional problems. These problems may include, for example, preventing damage to the battery from overcharging, the need for voltage, current, or power conversion or matching components between the fuel cell stack, battery and/or load, as well as the use of blocking diodes resulting in system inefficiency. A less costly, less complex and/or more efficient approach is desirable.

BRIEF SUMMARY OF THE INVENTION

In one aspect, a fuel cell system includes: a fuel cell stack, a battery, a series pass element electrically coupled between at least a portion of the fuel cell stack and a portion of the battery, and a regulating circuit for regulating current through the series pass element in response to a greater of a battery charging current error, a battery voltage error, and a stack current error. The fuel cell system may include a battery charging current error integrator having a first input coupled to receive a battery charging current signal and a second input coupled to receive a battery charging current limit signal. The fuel cell system may also include a battery voltage error integrator having a first input coupled to receive a battery voltage signal and a second input coupled to receive a battery voltage limit signal. The fuel cell system may further include a stack current error integrator having a first input coupled to receive a stack current signal and a second input coupled to receive a stack current limit signal. The fuel cell system may additionally include an OR circuit for selecting a greater of the battery charging current error, the battery voltage error and the stack current error.

In another aspect, a fuel cell system includes: a number of fuel cells forming a fuel cell stack, a number of battery cells forming a battery, a series pass element, a blocking diode electrically coupled between the fuel cell stack and the series pass element, and a regulating circuit for regulating current through the series pass element in proportion to at least a greater of a difference between a battery charging current and a battery charging current limit, a difference between a battery voltage and a battery voltage limit, and a difference between a stack current and a stack current limit.

In yet another aspect, a control circuit for a fuel cell system includes a series pass element electrically coupleable between at least a portion of the fuel cell stack and a portion of the battery and a regulating circuit for regulating current through the series pass element in response to a greater of a battery charging current error, a battery voltage error and a stack current error.

In a further aspect, a control circuit for a fuel cell system includes a series pass element, a blocking diode electrically coupled in series with the series pass element, and a regulating circuit coupled to the series pass element to regulate a current through the series pass element in proportion to at least a greater of a difference between a battery charging current and a battery charging current limit, a difference between a battery voltage and a battery voltage limit, and a difference between a stack current and a stack current limit.

In yet a further aspect, a control circuit for a fuel cell system includes a battery charging sensor, a battery charging current error integrator, a battery voltage sensor, a battery voltage error integrator, a stack current sensor, a stack current error integrator, an OR circuit coupled to the output of each of the battery current error integrator, the battery voltage error integrator and the stack current error integrator, and a series pass element having a pair of terminals for selectively providing a current path and a control terminal coupled to the OR circuit for regulating current through the current path in proportion to a greater of the battery current error signal, the battery voltage error signal and the stack current error signal.

In even a further aspect, a method of operating a fuel cell system includes: determining a battery charging current error, determining a battery voltage error, determining a stack current error, and regulating current through the series pass element in response to a greater of the battery charging current error, the battery voltage error and the stack current error. Determining the battery charging current error may include integrating a difference between a battery charging current and a battery charging current limit over time. Determining the battery voltage error may include integrating a difference between a battery voltage and a battery voltage limit over time. Determining the stack current error may include integrating a difference between a stack current and a stack current limit over time. The method may also include selecting the greater of the battery charging current error, the battery voltage error and the stack current error, level shifting the selected one of the errors, and applying the level shifted error to a control terminal of the series pass element. The method may further include determining a temperature proximate the battery and determining the battery voltage limit based at least in part on a determined temperature.

In still a further aspect, a method of operating a fuel cell system includes: determining a difference between a battery charging current and a battery charging current limit, determining a difference between a battery voltage and a battery voltage limit, determining a difference between a stack current and a stack current limit, and regulating a current through a series pass element in proportion to at least a greater of the difference between the battery charging current and the battery charging current limit, the difference between the battery voltage and the battery voltage limit, and the difference between the stack current and the stack current limit.

In yet still a further aspect, a combined fuel cell system includes two or more individual fuel cell systems electrically coupled in series and/or parallel combinations to produce a desired current at a desired voltage.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
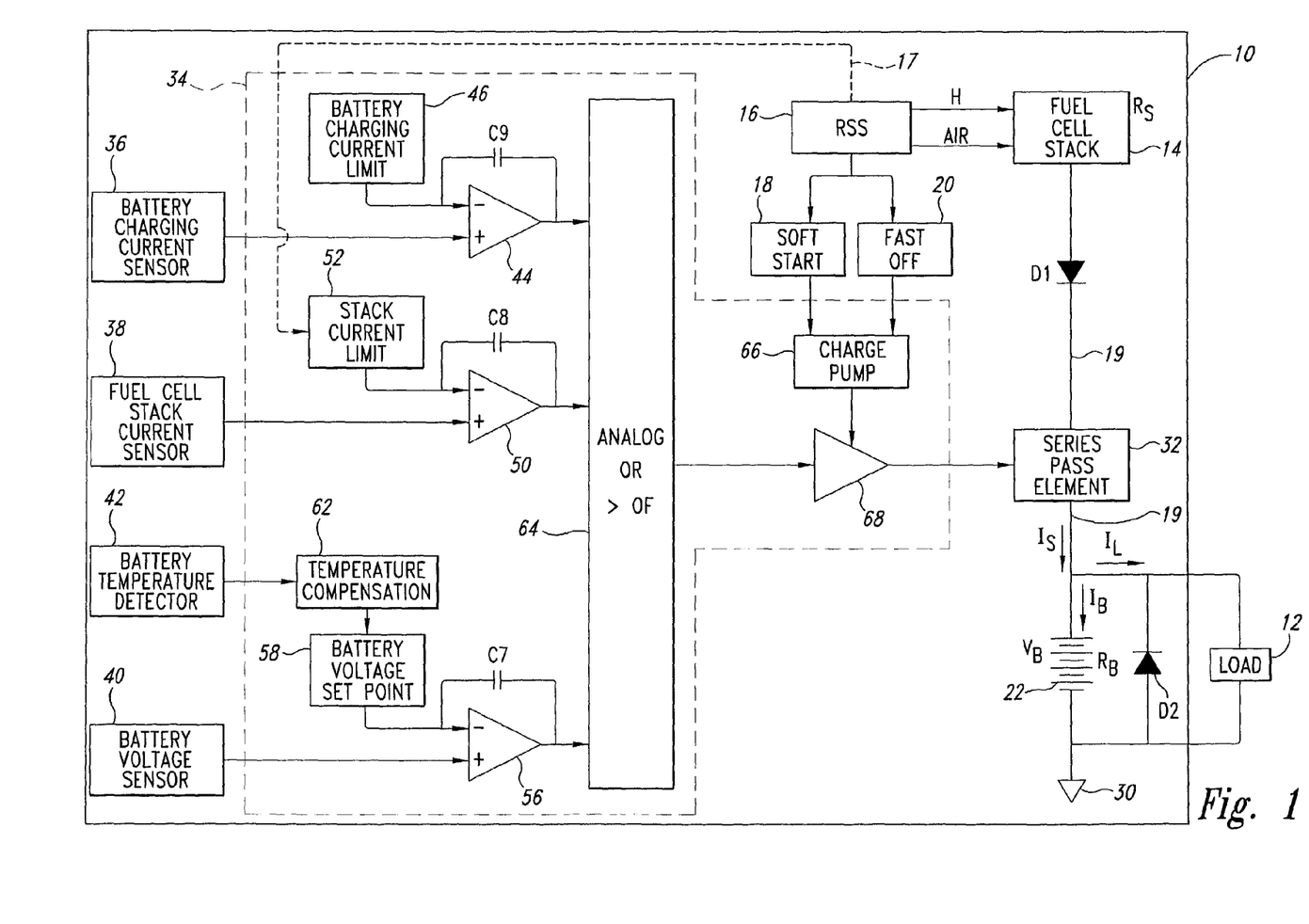
FIG. 1 is a schematic diagram of a fuel cell system having a fuel cell stack, a battery, series pass element, and a regulating circuit for controlling current flow through the series pass element in accordance with an illustrated general embodiment in the invention.

FIG. 1 shows a fuel cell system 10 providing power to a load 12 according to an illustrated embodiment of the invention. The load 12 typically constitutes the device to be powered by the fuel cell system 10, such as a vehicle, appliance, computer and/or associated peripherals. While the fuel cell system 10 is not typically considered part of the load 12, in some aspects portions of the fuel cell system 10 such as the control electronics may constitute a portion or all of the load 12.

The fuel cell system 10 includes a fuel cell stack 14 composed of a number of individual fuel cells electrically coupled in series. The fuel cell stack 14 receives reactants such as hydrogen and air from a reactant supply system 16. The reactant supply system 16 may include one or more reactant supply reservoirs (not shown), a reformer (not shown), and/or one or more control elements (not shown) such as one or more compressors, pumps and/or valves or other reactant regulating elements. Operation of the fuel cell stack 14 produces reactant products, such as water. The fuel cell system 10 may reuse some or all of the reactant products, for example to humidify the hydrogen and air at the correct temperature and/or to hydrate the ion exchange membranes (not shown).

The fuel cell stack 14 can be modeled as an ideal battery having a voltage equivalent to an open circuit voltage and a series resistance $R_s$. The value of the series resistance $R_S$ is principally a function of stack current $I_S$, the availability of reactants, and time. The series resistance $R_S$ varies in accordance with the polarization curves for the particular fuel cell stack 14. The series resistance $R_S$ can be adjusted by controlling the availability of reactants to drop a desired voltage for any given current, thus allowing an approximately uniform stack voltage $V_S$ across a range of stack currents $I_S$. This relationship is illustrated in FIG. 1 by the broken line arrow 17. The fuel cell system 10 may control the reactant partial pressure to regulate the availability of the reactants.

Figure 6:
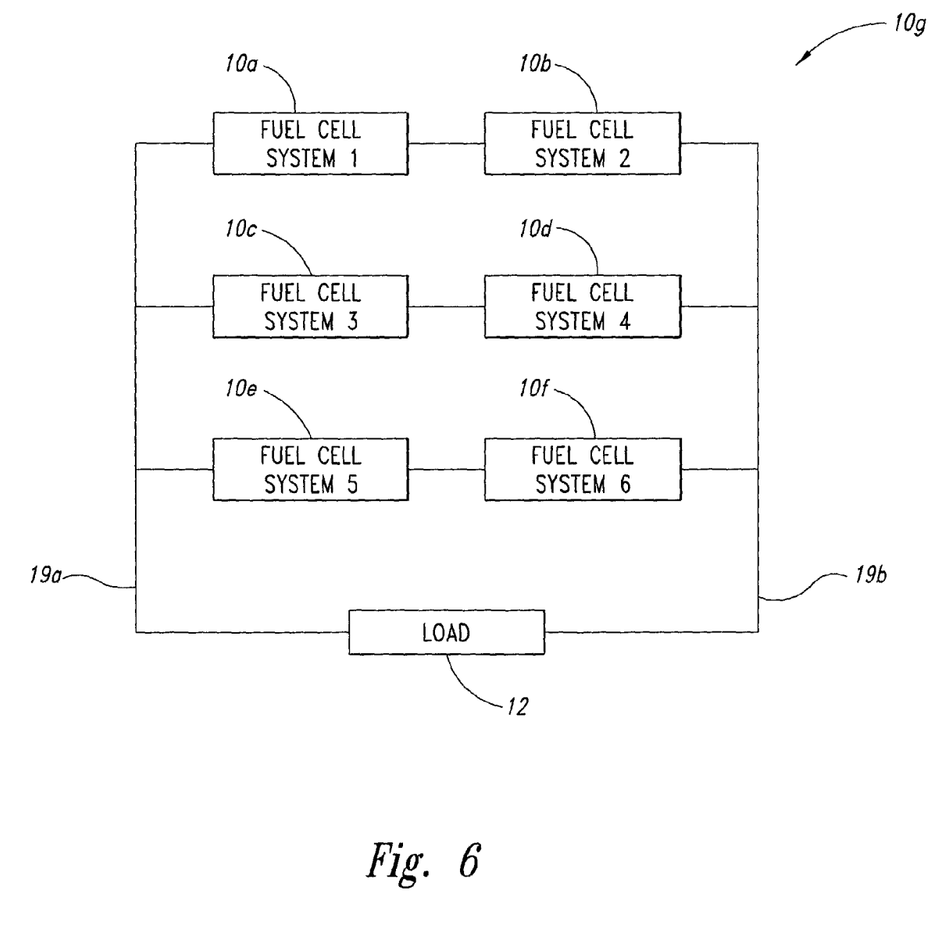
FIG. 6 is a schematic diagram of a number of the fuel cell systems of FIGS. 1 and 2, electrically coupled to form a combination fuel cell system for powering a load at a desired voltage and current.

The fuel cell stack 14 produces a voltage $V_S$ across a high voltage bus 19 formed by the positive and negative voltage rails 19a, 19b (FIG. 6). A stack current $I_S$ flows to the load 12 from the fuel cell stack 14. As used herein, high voltage refers to the voltage produced by conventional fuel cell stacks 14 to power work loads, and is used to distinguish between other voltages employed by fuel cell control system (e.g., 5V). Thus, high voltage and is not necessarily "high" with respect to other electrical systems.

The fuel cell system 10 includes a battery 22 electrically coupled in parallel with the fuel cell stack 14 on the high voltage bus 19 to power the load 12. The open circuit voltage of the battery 22 is selected to be similar to the full load voltage of the fuel cell stack 14. The internal resistance $R_B$ of the battery 22 is selected to be much lower than the internal resistance of the fuel cell stack 14. Thus, the battery 22 acts as a buffer, absorbing excess current when the fuel cell stack 14 produces more current than the load 12 requires, and providing current to the load 12 when the fuel cell stack 14 produces less current than the load 12 requires. The bus voltage will be the open circuit voltage of the battery 22 minus the battery discharging current multiplied by the value of the battery's internal resistance $R_B$. The smaller the internal resistance $R_B$ of the battery 22, the smaller the variations in bus voltage.

Since the battery 22 covers any short-term mismatch between the available reactants and the consumed reactants, the speed at which the fuel cell reactant supply system 16 needs to react can be much slower than the speed of the electrical load changes. The speed at which the fuel cell reactant supply system 16 needs to react mainly effects the depth of the charge/discharge cycles of the battery 22.

A reverse current blocking diode D1 is electrically coupled between the fuel cell stack 14 and the battery 22 to prevent current from flowing from the battery 22 to the fuel cell stack 14. The fuel cell system 10 may also include a reverse shorting diode D2 electrically coupled in parallel with the battery 22 and load 12 to prevent reverse shorting. The fuel cell system 10 may also include a fuse 28 electrically coupled in series with the load 12 to protect the fuel cell system 10 against power surges. The fuel cell system 10 may further include a ground 30.

The fuel cell system 10 includes a series pass element 32 electrically coupled between the fuel cell stack 14 and the battery 22 for controlling a flow of current $I_S$ from the fuel cell stack 14 to the battery 22 and the load 12. The fuel cell system 10 also includes a regulating circuit 34 coupled to regulate the series pass element 32 based on various operating parameters of the fuel cell system 10.

The fuel cell system 10 includes a number of sensors for determining the various operating parameters. For example, the fuel cell system 10 includes a battery charge current sensor 36 coupled to determine the battery current $I_B$. Also for example, the fuel cell system 10 includes a fuel cell stack current sensor 38 coupled to determine the stack current $I_S$. Further for example, the fuel cell system 10 includes a battery voltage sensor 40 for determining a voltage $V_B$ across the battery 22. Additionally, the fuel cell system 10 may include a battery temperature sensor 42 positioned to determine the temperature of the battery 22. While illustrated as being discrete from the regulating circuit 34, in some embodiments one or more of the sensors 36–42 may be integrally formed as part of the regulating circuit.

The regulating circuit 34 includes components for determining a battery charging current error, stack current error and battery voltage error, and for producing an output to the series pass element corresponding to the greater of the determined errors.

The regulating circuit 34 includes a battery charging current error integrating circuit 44 and a battery charging current limit circuit 46 for determining the battery charging current error. The battery charging current limit circuit 46 provides a battery charging current limit value to the inverting terminal of the battery charging current error integrating circuit 44, while the battery charging current sensor 36 provides a battery charging current value to the non-inverting terminal. A capacitor C9 is coupled between the inverting terminal and an output terminal of the battery charging current error integrating circuit 44. The battery charging current limit error integrating circuit 44 integrates the difference between the battery charging current value and the battery charging current limit value.

The regulating circuit 34 includes a stack current error integrating circuit 50 and a stack current limit circuit 52 for determining the stack current error. The stack current limit circuit 52 provides a stack current limit value to the inverting terminal of the stack current error integrating circuit 50, while stack current sensor 38 provides a stack current value to the non-inverting terminal. A capacitor C8 is coupled between the inverting terminal and an output terminal of the stack current error integrating circuit 50. The stack current error integrating circuit 50 integrates the difference between the stack current value and the stack current limit value.

The regulating circuit 34 includes a battery voltage error integrating circuit 56 and a battery voltage set point circuit 58. The battery voltage set point circuit 58 provides a battery voltage limit value to the inverting terminal of the battery voltage error integrating circuit 56, while the battery voltage sensor 40 provides a battery voltage value to the non-inverting terminal. A capacitor C7 is electrically coupled between the inverting terminal and the output terminal of the battery voltage error integrating circuit 56. The battery voltage error integrating circuit 56 integrates the difference between the battery voltage value and the battery voltage set point value.

The regulating circuit 34 may also include a temperature compensation circuit 62 that employs the battery temperature measurement from the battery temperature detector 42 to produce a compensation value. The battery voltage set point circuit 58 employs the compensation value in determining the battery voltage set point value.

The regulating circuit 34 also includes an OR circuit 64 for selecting the greater of the output values of the error integrators 44, 50, 56. The regulating circuit 34 also includes a charge pump 66 for providing a voltage to a control terminal of the series pass element 32 by way of a level shifter, such as an inverting level shifter 68. The inverting level shifter 68 provides a linear output value that is inverted from the input value.

The fuel cell system 10 may include a soft start circuit 18 for starting the charge pump 66 which slowly pulls up the voltage. The fuel cell system 10 may also include a fast off circuit 20 for quickly turning off the charge pump 66 to prevent damage to the battery 22, for example when there is no load or the load 12 is drawing no power.

Figure 2:
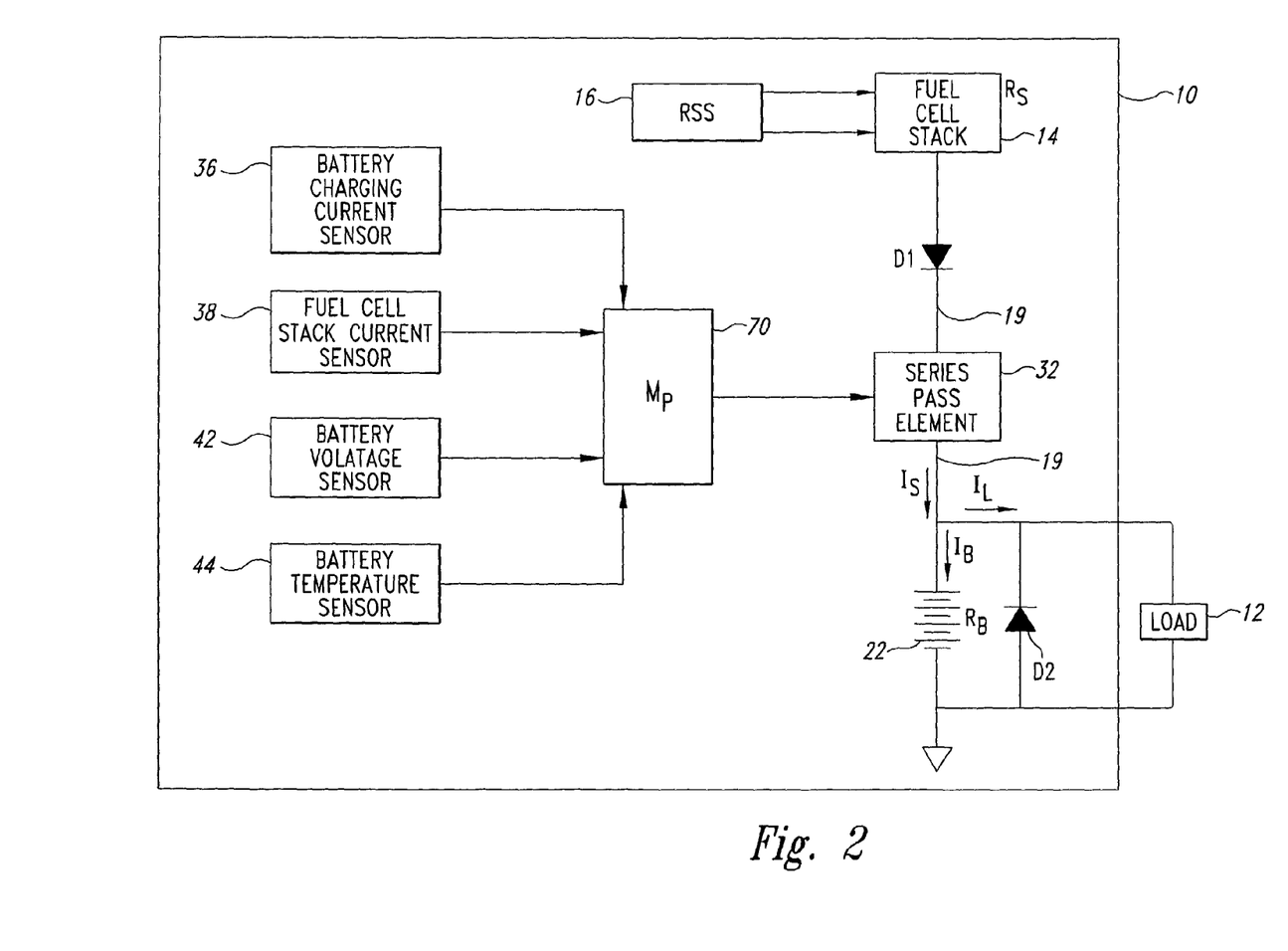
FIG. 2 is a schematic diagram of an alternative embodiment of the fuel cell system that employs a microprocessor as the regulating circuit.

FIG. 2 shows an alternative embodiment of the fuel cell system 10, employing a microprocessor 70 as the regulating circuit. This alternative embodiment and those other alternatives and alternative embodiments described herein are substantially similar to the previously described embodiments, and common acts and structures are identified by the same reference numbers. Only significant differences in operation and structure are described below.

The microprocessor 70 can be programmed or configured to perform the functions of the regulating circuit 34 (FIG. 1). For example, the microprocessor 70 may perform the error integration for some or all of the battery charging current, stack current and battery voltage values. The microprocessor 70 may store some or all of the battery charging current limit, stack current limit and/or battery voltage limit values. The microprocessor 70 may also determine the temperature compensation based on the battery temperature value supplied by the battery temperature detector 42. Further, the microprocessor 70 may select the greater of the error values, providing an appropriate signal to the control terminal of the series pass element 32.

Figure 3:
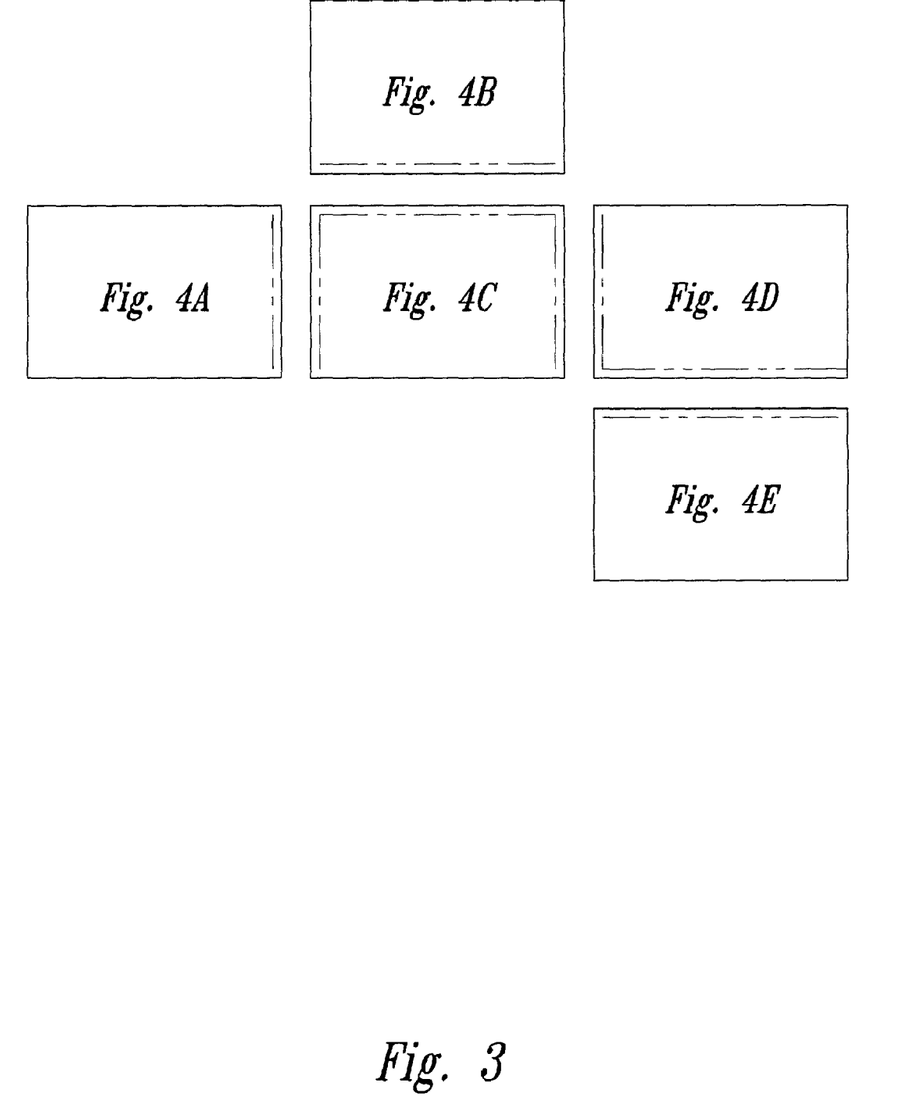
FIG. 3 is a diagram illustrating the relative positions of FIGS. 4A–4E.

FIG. 3 shows the arrangement of the drawings sheets comprising FIGS. 4A–4E. FIGS. 4A–4E are an electrical schematic illustrating one embodiment of the fuel cell system of FIG. 1.

A power bus includes positive and negative rails 100, 102, respectively, that electrically couple the battery 22 in parallel with the fuel cell stack 14. (The battery 22 is illustrated in FIGS. 4A–4E as first and second battery portions B1, B2, respectively.) The load 12 is selectively coupled across the positive and negative rails 100, 102 in parallel with the fuel cell stack 12 and battery portions B1, B2.

The reverse current blocking diode D1 is electrically coupled between the fuel cell stack 14 and the battery portions B1, B2. The series pass element 32 (FIG. 1) can take the form of a field effect transistor ("FET") Q1, electrically coupled between the blocking diode D1 and the battery portions B1, B2. The reverse shorting diode D2 is electrically coupled in parallel with the load and the battery portions B1, B2 to prevent forward biasing of the FET Q1. The fuse F1 is electrically coupled in series with the load to provide protection from surges.

The stack current sensor 38 (FIG. 1) can take the form of a first Hall effect sensor A1 coupled between a source of the FET Q1 and the node formed by the load 12 and the battery portions B1, B2. The first Hall effect sensor A1 includes three poles, the third pole being coupled to ground and the first and second poles electrically coupled to the battery charging current and stack current error integrators as described below. The battery charging current sensor 36 (FIG. 1) can take the form of a second Hall effect sensor A2 coupled between the battery portions B1, B2 and the node formed by the load 12 and the battery portions B1, B2. The second Hall effect sensor A2 includes three poles, the third pole being coupled to ground and the first and second poles electrically coupled to the battery charging current and stack current error integrators as described below. A fuse F2 is electrically coupled between the first and second Hall effect sensors A1, A2.

Figure 4A:
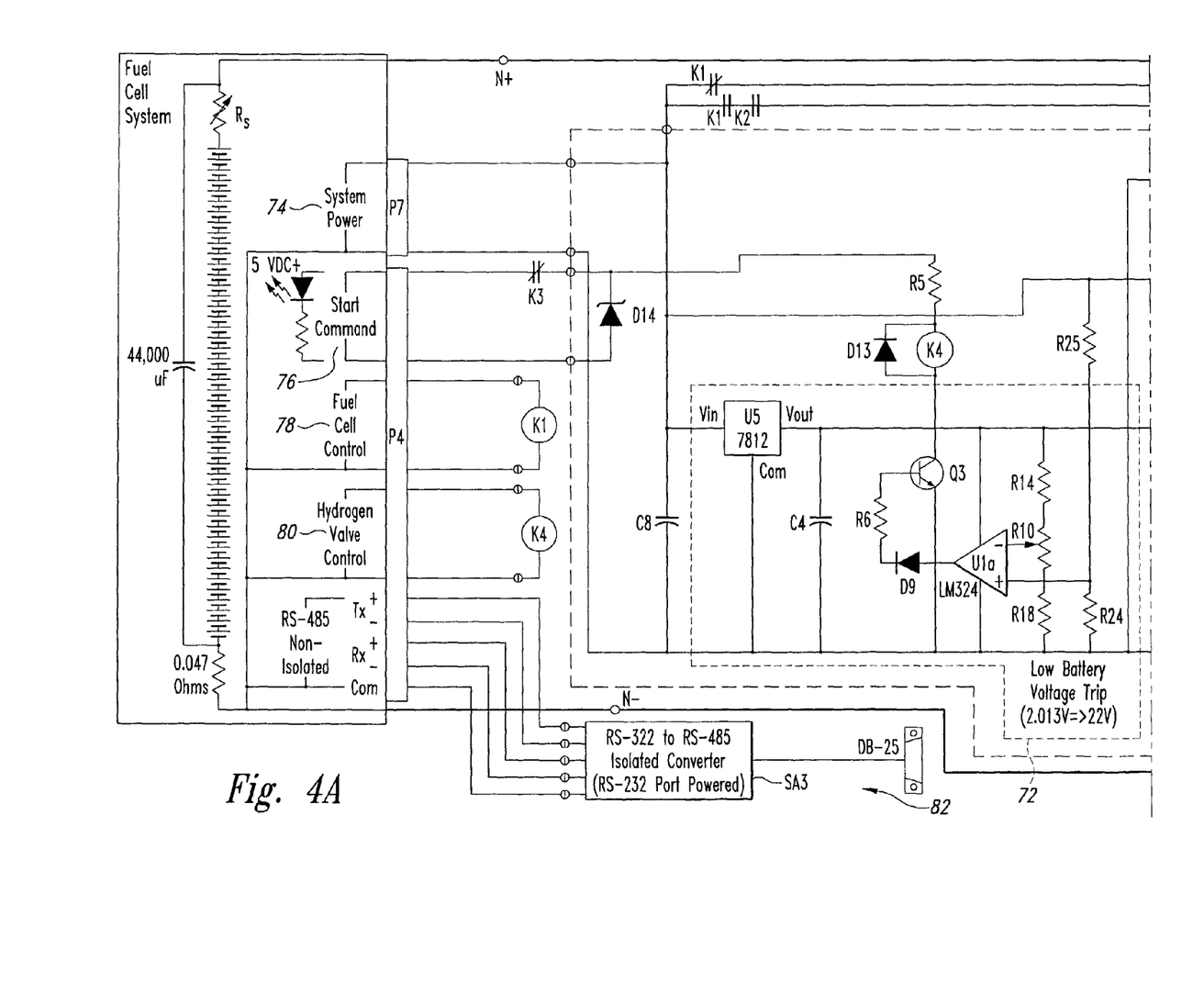
FIGS. 4A–4E are an electrical schematic diagram of the fuel cell system of FIG. 1.
Figure 4B:
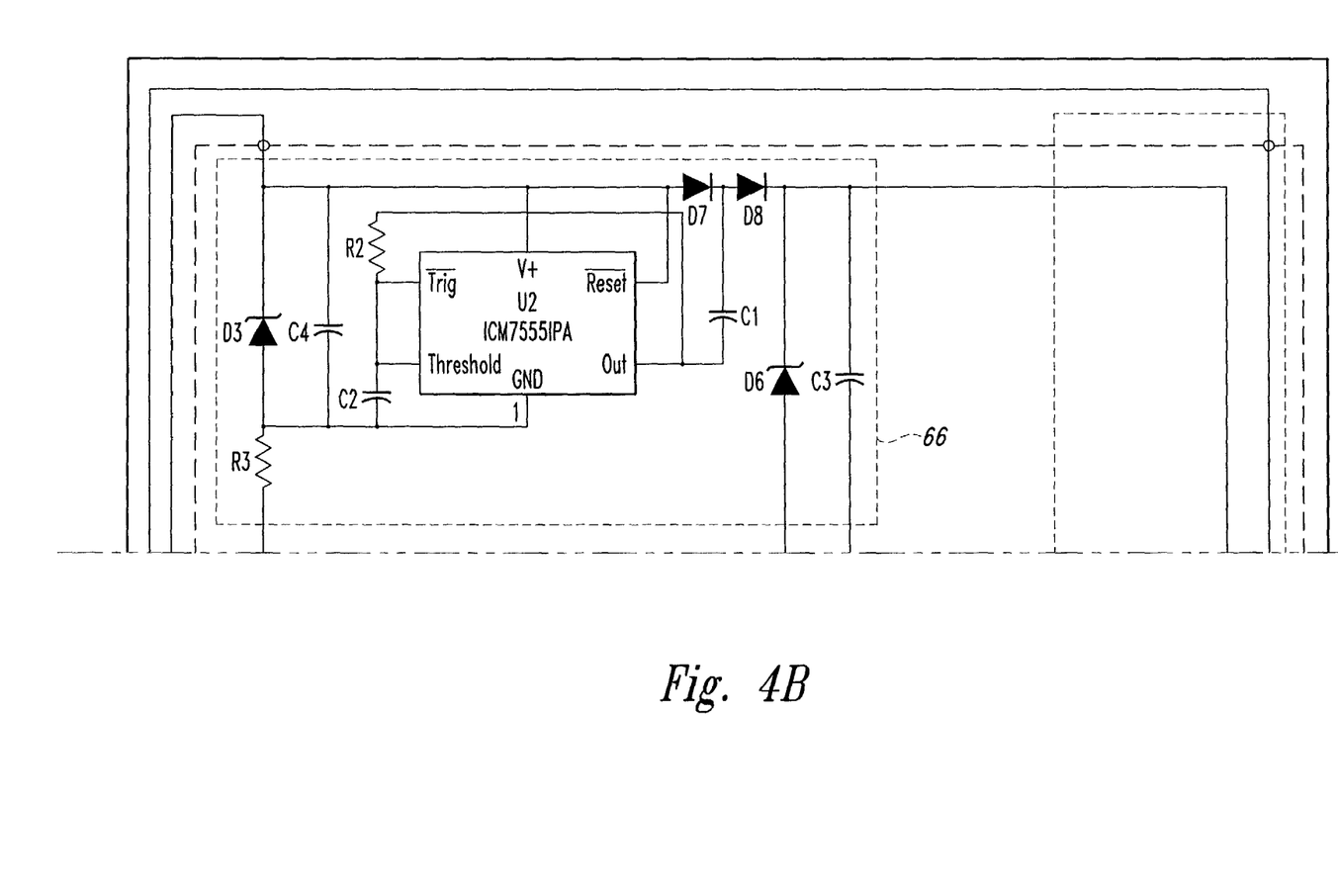
Figure 4C:
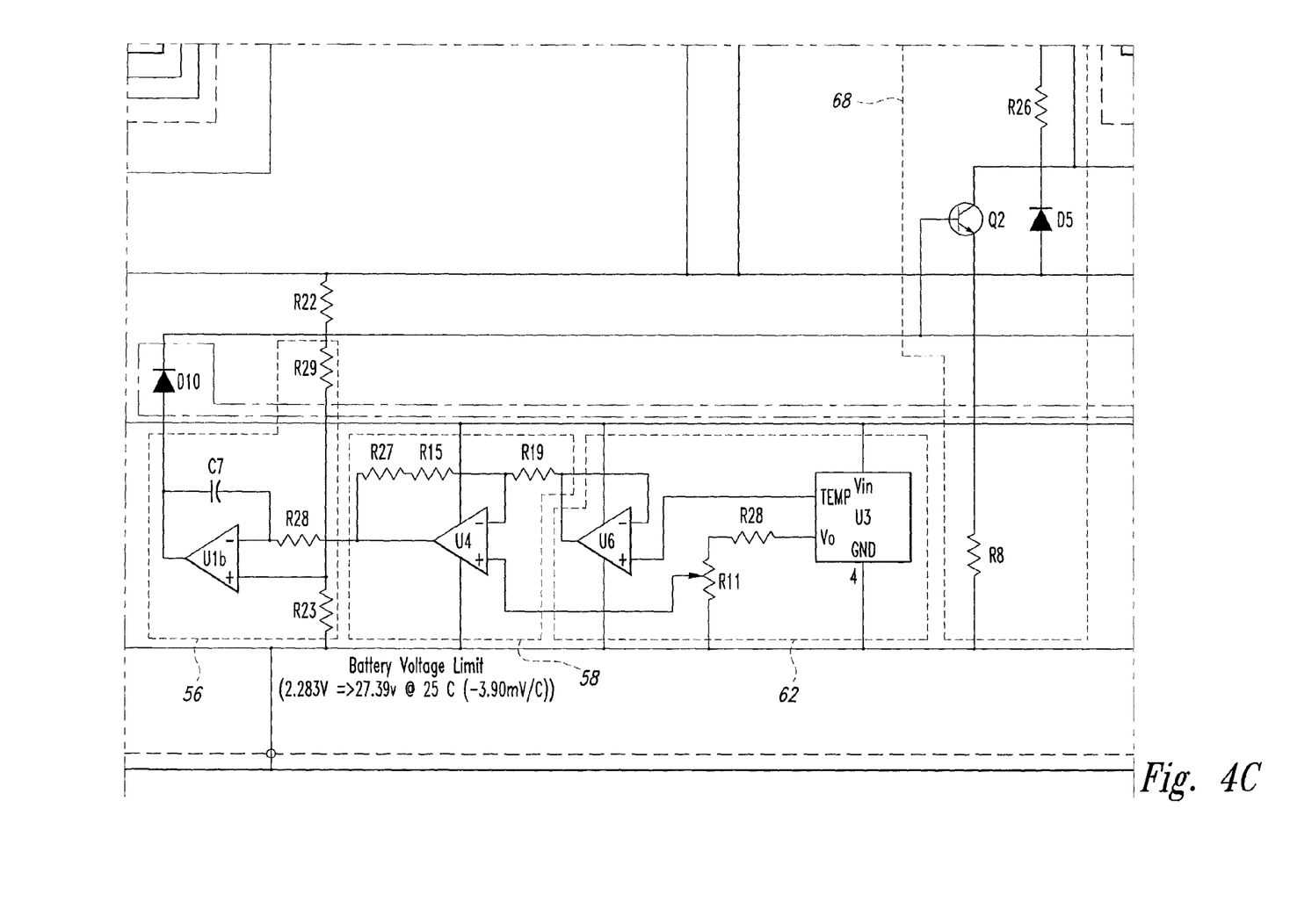
Figure 4D:
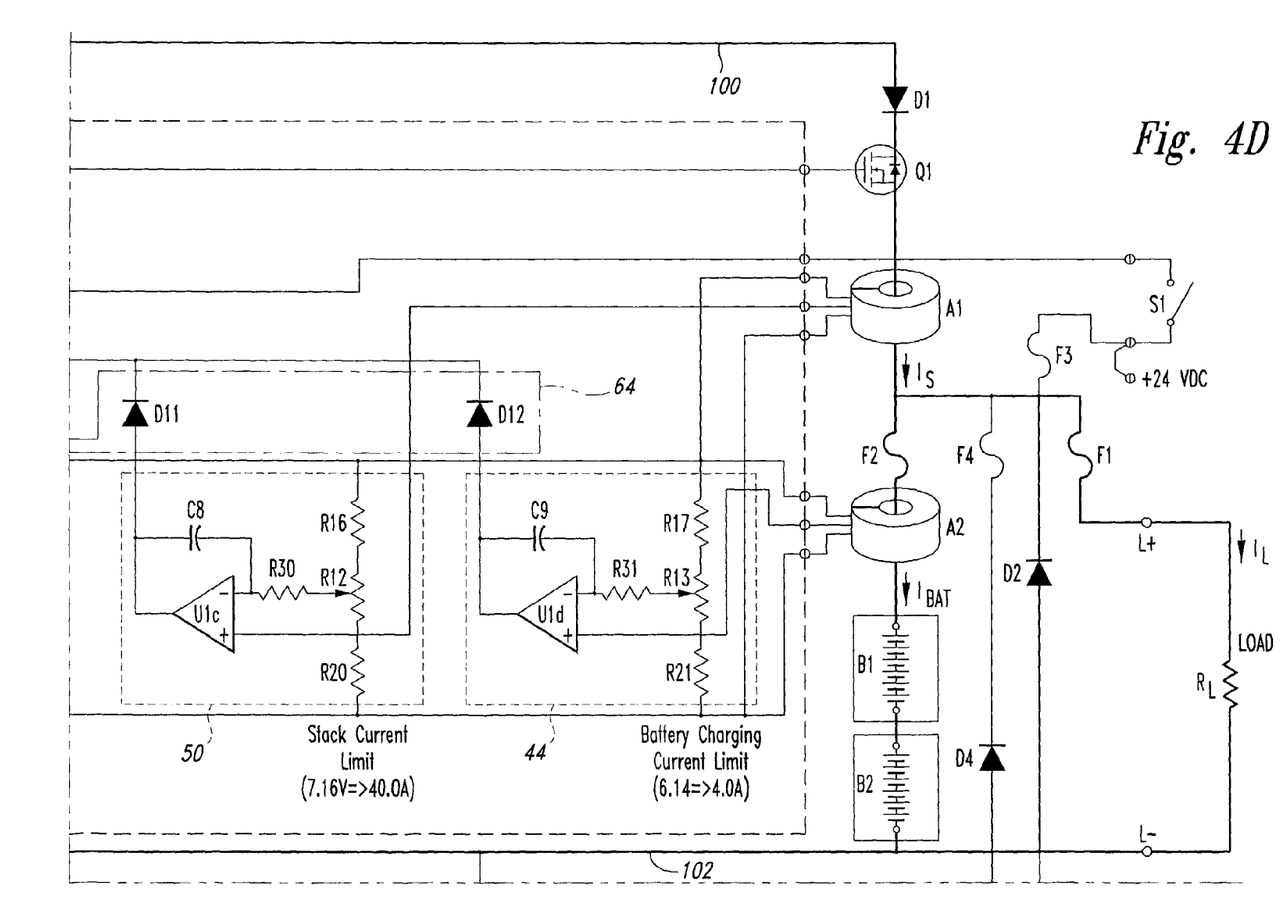
Figure 4E:
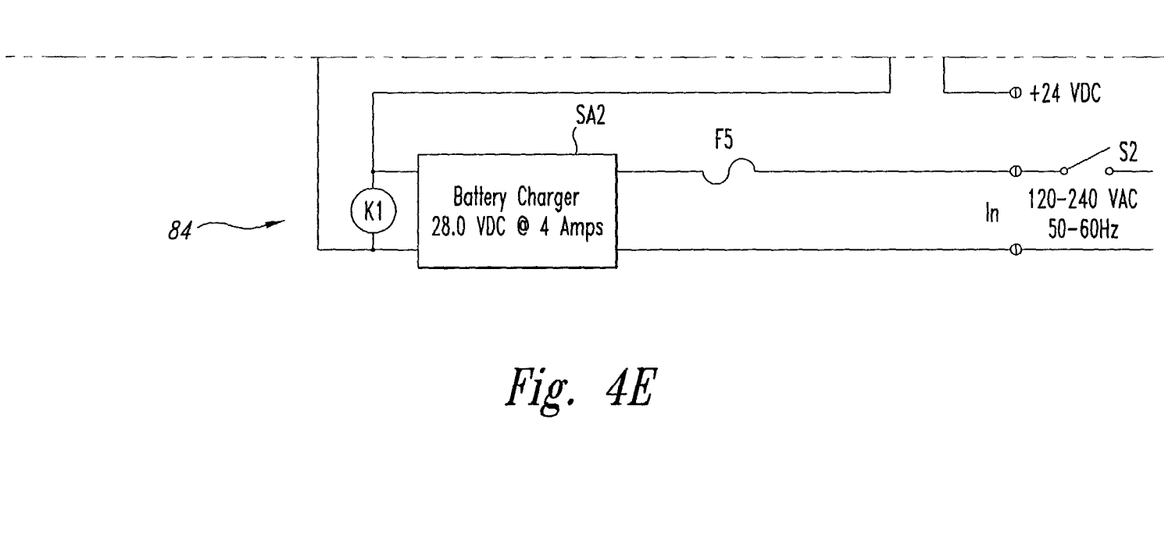

As illustrated in FIG. 4E, the battery charging current error integrating circuit 44 includes battery charging current error integrator U1d and a voltage divider formed by resistors R31, R13 R17 and R21. The non-inverting terminal of the battery charging current error integrator U1d is electrically coupled to the second pole of the second Hall effect sensor A2. The inverting terminal of the battery charging current error integrator U1d is electrically coupled to the first pole of the first Hall effect sensor A1 through the voltage divider formed by resistors R31, R13 R17 and R21. The inverting terminal of the battery charging current error integrator U1d is also coupled to the output terminal of the battery charging current error integrator U1d through the capacitor C9.

Also as illustrated in FIG. 4E, the stack current error integrating circuit 50 includes a stack current error integrator U1c and a voltage divider formed by resistors R30, R12, R16 and R20. The non-inverting terminal of the stack current error integrator U1c is electrically coupled to the second pole of the first Hall effect sensor A1. The inverting terminal of the stack current error integrator U1c is electrically coupled to the first pole of the second Hall effect sensor A2 through the voltage divider formed by resistors R30, R12, R16 and R20. The inverting terminal of the stack current error integrator U1c is also coupled to the output terminal of the stack current error integrator U1c through capacitor C8.

As illustrated in FIG. 4D, the battery voltage error integrating circuit 56 includes a battery voltage error integrator U1b and a voltage divider formed by resistors R23, R29. The non-inverting terminal of the battery voltage error integrator U1b is electrically coupled to the second pole of the first Hall effect sensor A1. The inverting terminal of the battery voltage error integrator U1b is electrically coupled to the battery voltage set point circuit 58, which is formed by U4 and resistors R15, R19, R27. The battery voltage set point circuit 58 is electrically coupled to the temperature compensation circuit 62 (FIG. 1), which include integrated circuits U6 and U3. The inverting terminal of the battery voltage error integrator U1b is also coupled to the output terminal of the battery voltage error integrator U1b through capacitor C7.

The OR circuit 64 is formed by the diodes D10, D11, D12 having commonly coupled cathodes. The anode of each of the diodes D10, D11, D12 is electrically coupled to a respective one of the error integrators U1b, U1c, U1d.

The level shifter 68 includes a transistor such as the bipolar transistor Q2, resistors R8, R26 and diode D5. The resistor R8 electrically couples an emitter of the transistor Q2 to ground. A collector of the transistor Q2 is electrically coupled to the gate of the field effect transistor Q1 and a base of the transistor Q2 is electrically coupled to the output of the OR circuit 64. The diode D5 prevents the gate of the FET Q1 from being pulled down too low.

The charge pump 66 includes an integrated circuit U2, zener diodes D3, D6 capacitors C1, C3, C2, C4, resistors R2, R3 and diodes D7, D8. The output of the charge pump 66 is electrically coupled to the collector of the transistor Q2 and to the gate of the FET Q1. The bipolar transistor Q2 sinks charge from the charge pump 66 to the grounded resistor R8 in proportion to the output of the OR circuit 64 (i.e., diodes D10, D11, D12) to control the voltage applied to the gate of the FET Q1. Thus, the amount of stack current $I_S$ that the FET Q1 passes is proportional to the greater of the battery charging current error value, stack current error value and battery voltage error value (i.e., outputs of the error integrators U1b, U1c, U1d, respectively).

Additionally, the fuel cell system 10 can include a low battery voltage regulating circuit 72. The low battery voltage regulating circuit 72 includes an integrator U1a, bipolar transistor Q3, integrated circuit U5, diode D9, resistor R6, and a voltage divider including resistors R10, R14, R18, R24. An output of the integrator U1a is electrically coupled to the base of the transistor Q3 through the diode D9 and resistor R6.

Further, the fuel cell system 10 can include a number of subsystems. For example, the fuel cell system 10 may include a system power subsystem 74 for powering the control circuitry of the fuel cell system 10. A start command subsystem 76 starts operation of the fuel cell system in response to an operator selection after the start command subsystem determines that the fuel cell system 10 is ready for operation, for example after checking parameters such as temperature. A control subsystem 78 for controlling operation of the fuel cell system 10. A hydrogen valve control subsystem 80 for controlling the flow of hydrogen to the fuel cell stack 14.

An isolation circuit 82 prevents shorting of the battery 22 through the communications ports. The isolation circuit 82 includes an isolated converter SA3 electrically coupled to a standard connector DB-25. A battery charging subsystem 84 allows the battery 22 to be recharged independently of the fuel cell stack 14. The battery charging subsystem 84 includes a battery recharging circuit SA2, fuse F5 and switch S2. A second reverse shorting diode D4 and a fuse F4 are electrically coupled between the positive rail 100 and the battery charger SA2, in parallel with the battery portions B1, B2.

The fuel cell system 10 includes a number of other discrete components such as capacitances K1, K2, K3, diode D14, resistors R5, R22, R25, and switch S1, as illustrated in the electrical schematic of FIGS. 4A–4E. Since the battery portions B1, B2 appear as large capacitances to the control circuitry, the fuel cell system's control circuitry includes a 90 degree phase shift of all outer control loops.

Figure 5:
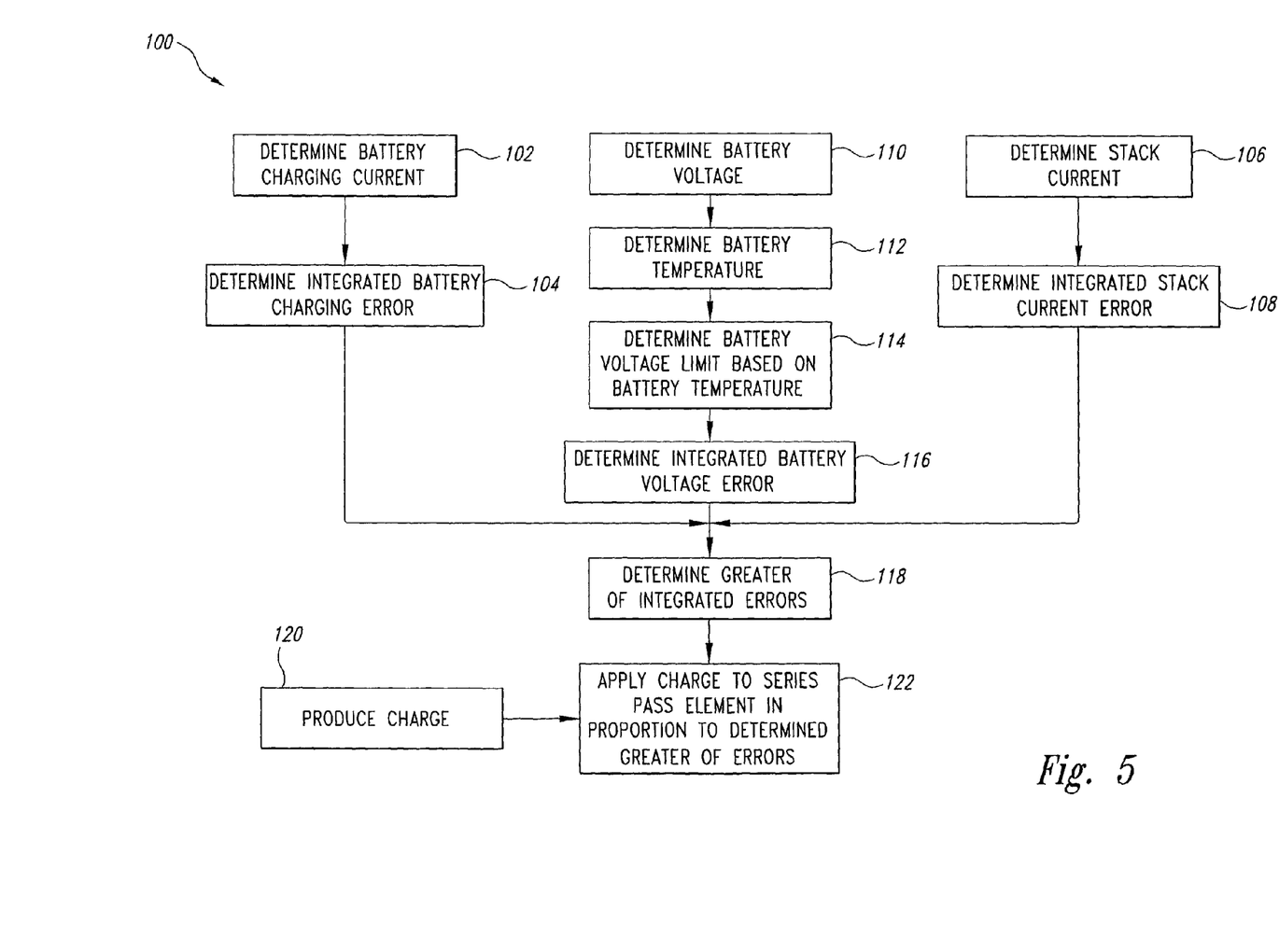
FIG. 5 is a flow diagram of an exemplary method of operating the fuel cell system of FIGS. 1 and 2.

FIG. 5 shows an exemplary method 100 of operating the fuel cell systems 10 of FIGS. 1 and 2. The method 100 repeats during operation of the fuel cell to continually adjust the operation of the fuel cell system 10.

In step 102, the battery charging current sensor 36 (FIGS. 1 and 2) determines the value of the battery charging current $I_B$. In step 104, the battery charging current error integrating circuit 44 (FIG. 1) or microprocessor 70 (FIG. 2) determines the value of the battery charging current error.

In step 106, the stack current sensor 38 (FIGS. 1 and 2) determines the value of the stack current. In step 108, the stack current error integrating circuit 50 (FIG. 1) or microprocessor 70 (FIG. 2) determines the value of the stack current error.

In step 110, the battery voltage sensor 40 (FIGS. 1 and 2) determines the value of the voltage $V_B$ across the battery 22. In optional step 112, the battery temperature sensor 42 determines the temperature of the battery 22 or the ambient space proximate the battery 22. In optional step 114, the temperature compensation circuit 62 (FIG. 1) or microprocessor 70 (FIG. 2) determines the value of the battery voltage limit based on determined battery temperature. In step 116, the battery voltage error integrating circuit 56 (FIG. 1) or microprocessor 70 (FIG. 2) determines the value of the battery voltage error.

The fuel cell system 10 may perform the steps 102, 106 and 110 in a different order than described above, for example performing step 106 before step 102, or performing step 110 before step 102 and/or step 106. The sensors 36, 38, 40, 42 may perform the steps 102, 106, 110, 112 at the same time or approximately at the same time so as to appear be operating in parallel. Thus, the enumeration of the above acts does not identify any specific sequence or order.

In step 118, the OR circuit 64 (FIG. 1) or an OR circuit configured in the microprocessor 70 (FIG. 2) determines the greater of the determined errors values. The OR circuit may be hardwired in the microprocessor 70, or may take the form of executable instructions. In step 120, the charge pump 66 (FIG. 1) produces charge. While not illustrated, the embodiment of FIG. 2 may also include a charge pump, or the microprocessor 70 can produce an appropriate signal value. In step 122, the level shifter 68 (FIG. 1) or microprocessor 70 (FIG. 2) applies the charge as an input voltage to the control terminal of the series pass element 32 (FIGS. 1 and 2) in proportion to determined greater of errors values.

The fuel cell system 10 thus operates in essentially three modes: battery voltage limiting mode, stack current limiting mode, and battery charging current limiting mode. For example, when the battery 22 is drained, the fuel cell system 10 will enter the battery charging current mode to limit the battery charging current in order to prevent damage to the battery 22. As the battery 22 recharges, the fuel cell system 10 enters the battery voltage limiting mode, providing a trickle charge to the battery 22 in order to maintain a battery float voltage (e.g., approximately 75%–95% of full charge) without sulfating the battery 22. As the load 12 pulls more current than the fuel cell stack 14 can provide, the fuel cell system 10 enters the stack current limiting mode. Additionally, there can be a fourth "saturation" mode where, as the load 12 pulls even more current, the stack voltage $V_S$ drops below the battery voltage $V_B$. The battery 22 will discharge in this "saturation" mode, eventually entering the battery charging current limiting mode when the battery 22 is sufficiently drained, as discussed above.

The above described approach reduces the possibility of cell reversal since the stack voltage $V_S$ is clamped to the battery voltage $V_B$. If a cell reversal is detected, a switch can automatically disconnect the fuel cell stack 14 from the battery 22. The battery 22 would continue to power the load 12 while the fault clears. The above described approach may eliminate the need for voltage, current or power conversion or matching components between the fuel cell stack 14, battery 22 and/or load 12.

FIG. 6 shows a number of fuel cell systems 10a–10f, electrically coupled to form a combined fuel cell system 10g, for powering the load 12 at a desired voltage and current. The fuel cell systems 10a–10f can take the form of any of the fuel cell systems 10 discussed above, for example the fuel cell systems 10 illustrated in FIGS. 1 and 2.

For example, each of the fuel cell systems 10a–10f may be capable of providing a current of 50 A at 24V. Electrically coupling a first pair of the fuel cell systems 10a, 10b in series provides 50 A at 48V. Similarly electrically coupling a second pair of the fuel cells systems 10c, 10d in series provides 50 A at 48V. Electrically coupling these two pairs of fuel cell systems 10a, 10b and 10c, 10d in parallel provides 100 A at 48V. Electrically coupling a third pair of fuel cells systems 10e, 10f in series provides an 50 A at 48V. Electrically coupling the third pair of fuel cell systems 10e, 10f in parallel with the first and second pairs of fuel cell systems 10a:10b, 10c:10d, 10e:10f provides 150 A at 48V.

FIG. 6 shows only one possible arrangement. One skilled in the art will recognize that other arrangements for achieving a desired voltage and current are possible. A combined fuel cell system 10g may include a lesser or greater number of individual fuel cell systems 10a–10f than illustrated in FIG. 6. Other combinations of electrically coupling numbers of individual fuel cell systems 10 can be used to provide power at other desired voltages and currents. For example, one or more additional fuel cell systems (not shown) can be electrically coupled in parallel with one or more of the fuel cell systems 10a–10b. Additionally, or alternatively, one or more additional fuel cell systems (not shown) can be electrically coupled in series with any of the illustrated pairs of fuel cell systems 10a:10b, 10c:10d, 10e:10f. Further, the fuel cell systems 10a–10f may have different voltage and/or current ratings. The individual fuel cell systems 10a–10f can be combined to produce an "n+1" array, providing a desired amount of redundancy and high reliability.

Although specific embodiments of and examples for the fuel cell system and method are described herein for illustrative purposes, various equivalent modifications can be made without departing from the spirit and scope of the invention, as will be recognized by those skilled in the relevant art. For example, the teachings provided herein can be applied to fuel cell systems including other types of fuel cell stacks or fuel cell assemblies, not necessarily the polymer exchange membrane fuel cell assembly generally described above. Additionally or alternatively, the fuel cell system 10 can interconnect portions of the fuel cell stack 14 with portions of the battery B1, B2. The fuel cell system can employ various other approaches and elements for adjusting reactant partial pressures. The various embodiments described above can be combined to provide further embodiments. Commonly assigned U.S. patent application Serial No. 10/017,470 entitled "METHOD AND APPARATUS FOR CONTROLLING VOLTAGE FROM A FUEL CELL SYSTEM;" and U.S. patent application Ser. No. 10/017,461, entitled "FUEL CELL SYSTEM MULTIPLE STAGE VOLTAGE CONTROL METHOD AND APPARATUS," both filed concurrently with this application, are incorporated herein by reference in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and claims, but should be construed to include all fuel cell systems that operate in accordance with the claims. Accordingly, the invention is not limited by the disclosure, but instead its scope is to be determined entirely by the following claims.

I claim:

1. A control circuit for a fuel cell system having a fuel cell stack and a battery, the control circuit comprising:
    a series pass element electrically coupleable between at least a portion of the fuel cell stack and a portion of the battery; and
    a regulating circuit for linearly regulating current through the series pass element in response to a greater of a battery charging current error, a battery voltage error and a stack current error wherein the regulating circuit comprises:
        a battery charging current error integrator having a first input coupled to receive a battery charging current signal proportional to a battery charging current, a second input coupled to receive a battery charging current limit signal proportional to a battery charging current limit, and an output to supply a battery charging current error signal proportional to a difference between the battery charging current and the battery charging current limit;
        a battery voltage error integrator having a first input coupled to receive a battery voltage signal proportional to a battery voltage, a second input coupled to receive a battery voltage limit signal proportional to a battery voltage limit, and an output to supply a battery voltage error signal proportional to a difference between the battery voltage and the battery voltage limit;
        a stack current error integrator having a first input coupled to receive a stack current signal proportional to a stack current, a second input coupled to receive a stack current limit signal proportional to a stack current limit, and an output to supply a stack current error signal proportional to a difference between the stack current and the stack current limit; and
        an OR circuit coupled to the output of each of the error integrators to select a greater one of the error signals from the error integrators.

2. A control circuit for a fuel cell system having a fuel cell stack and a battery, the control circuit comprising:
    a series pass element electrically coupleable between at least a portion of the fuel cell stack and a portion of the battery wherein the series pass element comprises a transistor having a first terminal, a second terminal and a control terminal, the first and the second terminals coupleable between the fuel cell stack and the battery; and
    a regulating circuit for linearly regulating current through the series pass element in response to a greater of a battery charging current error, a battery voltage error and a stack current error wherein the regulating circuit comprises:
        a level shifter coupled to receive the greater of the battery charging current error, the battery voltage error and the stack current error; and
        a charge pump coupled to the control terminal of the transistor by way of the level shifter.

3. A control circuit for a fuel cell system, comprising:
    a series pass element;
    a blocking diode electrically coupled in series with the series pass element; and
    a regulating circuit coupled to the series pass element to regulate a current through the series pass element in proportion to at least a greater of a difference between a battery charging current and a battery charging current limit, a difference between a battery voltage and a battery voltage limit, and a difference between a stack current and a stack current limit wherein the regulating circuit comprises:
        a battery current integrator having a first input, a second input and an output, the first input coupled to receive a battery current value and the second input coupled to receive a battery current limit value;
        a battery voltage integrator having a first input, a second input and an output, the first input coupled to receive a battery voltage value and the second input coupled to receive a battery voltage limit value;
        a stack current integrator having a first input, a second input and an output, the first input coupled to receive a stack current value and the second input coupled to receive a stack current limit value; and
        an OR circuit coupled to the output of each of the battery current integrator, the battery voltage integrator and the stack current integrator to select the greater of a value on each of the outputs.

4. A control circuit for a fuel cell system, comprising:
    a series pass element;
    a blocking diode electrically coupled in series with the series pass element; and
    a regulating circuit coupled to the series pass element to regulate a current through the series pass element in proportion to at least a greater of a difference between a battery charging current and a battery charging current limit, a difference between a battery voltage and a battery voltage limit, and a difference between a stack current and a stack current limit wherein the regulating circuit comprises:
        a battery current integrator having a first input, a second input and an output, the first input coupled to receive a battery current value and the second input coupled to receive a battery current limit value;
        a battery voltage integrator having a first input, a second input and an output, the first input coupled to receive a battery voltage value and the second input coupled to receive a battery voltage limit value;
        a stack current integrator having a first input, a second input and an output, the first input coupled to receive a stack current value and the second input coupled to receive a stack current limit value;
        an OR circuit coupled to the output of each of the battery current integrator, the battery voltage integrator and the stack current integrator to select the greater of a value on each of the outputs;

a level shifter coupled to the OR circuit to receive the greater of the value on each of the outputs; and a charge pump coupled to the series pass element through the level shifter.

5. A control circuit for a fuel cell system, comprising:

a battery charging current sensor;

a battery charging current error integrator having a first input coupled to the battery charging current sensor to receive a battery charging current signal proportional to a battery charging current, a second input coupled to receive a battery charging current limit signal proportional to a battery charging current limit, and an output to supply a battery current error signal proportional to a difference between the battery charging current and the battery charging current limit;

a battery voltage sensor;

a battery voltage error integrator having a first input coupled to the battery voltage sensor to receive a battery voltage signal proportional to a battery voltage, a second input coupled to receive a battery voltage limit signal proportional to a battery voltage limit, and an output to supply a battery voltage error signal proportional to a difference between the battery voltage and the battery voltage limit;

a stack current sensor;

a stack current error integrator having a first input coupled to the stack current sensor to receive a stack current signal proportional to a stack current, a second input coupled to receive a stack current limit signal proportional to a stack current limit, and an output to supply a stack current error signal proportional to a difference between the stack current and the stack current limit;

an OR circuit coupled to the output of each of the battery current error integrator, the battery voltage error integrator and the stack current error integrator; and a series pass element having a pair of terminals for selectively providing a current path and a control terminal coupled to the OR circuit for regulating current through the current path in proportion to a greater of the battery current error signal, the battery voltage error signal and the stack current error signal.

6. The control circuit of claim 5 wherein the regulating circuit comprises a number of discrete integrators.

7. The control circuit of claim 5 wherein the regulating circuit comprises an analog OR circuit.

8. The control circuit of claim 5 wherein the regulating circuit comprises a microprocessor.

9. The control circuit of claim 5, further comprising:

a temperature compensation circuit coupled to the battery temperature sensor to produce a battery voltage limit that is compensated for temperature.

10. A control circuit for a fuel cell system, comprising:

integrating means for determining a difference between a battery charging current and a battery charging current limit;

integrating means for determining a difference between a battery voltage and a battery voltage limit;

integrating means for determining a difference between a stack current and a stack current limit;

means for determining a greater of the difference between the battery charging current and the battery charging current limit, the difference between the battery voltage and the battery voltage limit, and the difference between the stack current and the stack current limit; and series pass regulating means for regulating a flow of stack current through a blocking diode in proportion to the determined greater difference.

11. A control circuit for a fuel cell system, comprising:

means for determining a difference between a battery charging current and a battery charging current limit;

means for determining a difference between a battery voltage and a battery voltage limit;

means for determining a difference between a stack current and a stack current limit;

means for selecting a greater of the determined differences; and series pass regulating means for regulating a flow of stack current through a blocking diode in response to the greater of the determined differences.

12. A control circuit for a fuel cell system, comprising:

means for determining a difference between a battery charging current and a battery charging current limit;

means for determining a difference between a battery voltage and a battery voltage limit;

means for determining a difference between a stack current and a stack current limit;

means for selecting a greater of the determined differences;

series pass regulating means for regulating a flow of stack current through a blocking diode in response to the greater of the determined differences; and means for applying a signal to a control terminal of the series pass regulating means proportional to the greater of the determined differences.

* * * * *